United States Patent [19]

Redding et al.

[11] Patent Number: 5,160,236
[45] Date of Patent: Nov. 3, 1992

[54] RETRACTABLE VAN SIDE DOOR RAMP

[76] Inventors: Edward M. Redding, Suite A220 4300 San Mateo Blvd. NE., Albuquerque, N. Mex. 87110; Charles E. Redding, 361 S. Bateman Cir., Barrington Hills, Ill. 60010

[21] Appl. No.: 738,628

[22] Filed: Jul. 31, 1991

[51] Int. Cl.$^5$ .............................................. B60P 1/00
[52] U.S. Cl. ................................. 414/537; 414/522; 414/921; 14/71.1
[58] Field of Search ............... 414/522, 537, 538, 921; 14/71.1

[56] References Cited

U.S. PATENT DOCUMENTS

| | | |
|---|---|---|
| 147,600 | 2/1874 | Campbell . |
| 502,568 | 8/1893 | Kuckartz . |
| 1,717,303 | 6/1929 | Barclay ........................... 414/921 X |
| 1,777,966 | 10/1930 | Fageol . |
| 1,884,513 | 10/1932 | Barclay . |
| 2,233,181 | 2/1941 | Quartullo . |
| 2,370,427 | 2/1945 | Sherry . |
| 2,480,047 | 8/1949 | Reinhard . |
| 2,659,504 | 11/1953 | Kranawetvogel ............... 414/538 X |
| 2,788,751 | 4/1957 | Russell . |
| 2,892,556 | 6/1959 | Lowe ................................ 414/522 |
| 3,193,321 | 7/1965 | Rose . |
| 3,302,229 | 2/1967 | Teague, Jr. . |
| 3,651,965 | 3/1972 | Simonelli et al. ............... 414/921 X |
| 3,711,882 | 1/1973 | Iller . |
| 3,874,527 | 4/1975 | Royce . |
| 3,941,261 | 3/1976 | Ricci . |
| 4,026,387 | 5/1977 | Abreu . |
| 4,078,678 | 3/1978 | Tordella . |
| 4,131,209 | 12/1978 | Manning .......................... 414/537 |
| 4,143,281 | 3/1979 | Appley ............................ 414/921 X |
| 4,235,399 | 11/1980 | Shorey ............................. 14/71.1 X |
| 4,294,571 | 10/1981 | Tordella .......................... 414/537 |
| 4,479,753 | 10/1984 | Thorley ........................... 414/921 X |
| 4,671,730 | 6/1987 | Gateau ............................. 414/921 X |
| 4,759,682 | 7/1988 | Hood ................................ 414/537 |
| 4,778,328 | 10/1988 | Apgar .............................. 414/921 X |
| 4,827,548 | 5/1989 | Hood ................................ 14/71.1 |
| 5,064,335 | 11/1991 | Bergeron et al. ............... 414/522 |

FOREIGN PATENT DOCUMENTS

936484  5/1960  United Kingdom ............... 14/71.1

Primary Examiner—Frank E. Werner
Assistant Examiner—James Kennan
Attorney, Agent, or Firm—Jacobson, Price, Holman & Stern

[57] ABSTRACT

An elongated ramp is provided for longitudinal extension and retraction relative to a predetermined margin of a support structure therefor. The ramp includes a longitudinally short base end section and a considerably longer outer end section and the support and ramp include coacting guide structures for supporting and guiding the ramp during extension and retraction thereof, the outer end section of the ramp being automatically disengaged from the support and guide structure responsive to the ramp approaching its fully extended position. In a first form of ramp, a biasing structure is operatively connected between the sections yieldingly resisting downward swinging of the outer end section as it disengages from the support and guide structure during extension of the ramp and the biasing structure is operative to counteract a major portion, only, of the force of gravity acting upon the outer end section to swing the outer end thereof downwardly as the ramp moves to its fully extended position. A second form of ramp structure is provided for gently lowering the outer end of the ramp to the ground after full ramp extension and also for raising the outer portion of the ramp to an essentially horizontal position prior to ramp retraction.

20 Claims, 4 Drawing Sheets

RETRACTABLE VAN SIDE DOOR RAMP

This application is a substitute of prior U.S. patent application Ser. No. 350,441, filed May 11, 1989, and now abandoned.

BACKGROUND OF THE INVENTION

1. Field of the Invention

In many instances it is necessary for a person confined to a wheelchair to gain access to the interior of a vehicle such as a van and to subsequently depart from the van. In addition, many persons confined to wheelchairs are fully capable of driving a van-type of vehicle.

Most vans are equipped with side doors rearward of the right front passenger doors thereof. These side doors, which may be of either a hinged or sliding design, when open, provide a large ingress and egress opening through which a person confined to a wheelchair may move. However, in lieu of expensive and complex hydraulic or electric powered inwardly retractable elevator structures specifically designed to lift a person confined to a wheelchair from road or curb level to the level of the floor of the van, a ramp may be provided thus enabling the wheelchair confined person to elevate him or herself upwardly along the ramp and into an associated van. The ramp can be designed to be manually operated by a vehicle attendant or power operated by a handicapped person.

Electric and hydraulic retractable elevator structures as well as most previously known forms of loading ramp extending and retracting mechanisms are relatively complex, expensive, objectionable in appearance from the interior of the vehicle when retracted, and require considerable maintenance.

Accordingly, a need exists for a simplified form of wheelchair loading ramp for the side doors of vehicle-type vans.

2. Description of Related Art

Various different forms of ramps and other structures which may be used or modified for use to assist in loading a person confined in a wheelchair within a van are disclosed in U.S. Pat. Nos. 147,600, 502,568, 1,717,303, 1,777,966, 1,884,513, 2,233,181, 2,370,427, 2,480,047, 2,659,504, 2,788,751, 2,892,556, 3,193,321, 3,302,229, 3,651,965, 3,711,882, 3,874,527, 3,941,261, 4,026,387, 4,078,678, 4,131,209, 4,143,281, 4,235,399, 4,294,571, 4,479,753, 4,671,730, 4,759,682, 4,778,328, 4,827,548 and Great Britain Patent No. 936,484.

However, these previously known forms of ramp structures and the like do not include the overall combination of structural features of the instant invention which particularly well adapt a loading ramp for use in conjunction with a side door equipped van and provided for operation by a wheelchair confined person. Further, many of these previously known structures also fail to provide the desired type of structure with a minimum of cost and efficient and trouble free operation.

SUMMARY OF THE INVENTION

The ramp construction of the instant invention includes a relatively short base end portion and a considerably longer outer end portion. The ramp is mounted from the floor structure of an associated van and is extendable and retractable relative to the either the right or left side of the van immediately adjacent the lower margin of a side door opening in the van.

The ramp and the van floor include coacting structures for guidingly supporting the ramp from the van floor for extension and retraction relative thereto, but the coacting structure ceases to supportively support and guide the outer end portion of the ramp as the ramp moves to its fully extended position, the outer end portion of the ramp being pivotally joined to the base end portion thereof.

In operation the van operator, from either the inside or outside of the van, activates a mechanism (not shown), probably ultimately powered by the vehicle battery, which first opens the door and then horizontally extends the ramp from its storage position just below the floor structure until the main outer portion of the ramp clears the support and pivots slowly downward under the force of gravity until the outer end rests against the ground, or top of the curb, depending on the van location. The van operator in his wheelchair then uses the ramp to descend from the van to the street or curb or to ascend into the van under his own power or the power developed by a motorized wheelchair.

During remotely controlled operation of extending the ramp, the system requires a powered means for moving the ramp outward and a structure for supporting the outer portion of the ramp in an essentially horizontal position until the outer portion or section clears the guiding support structure therefor and the outer section starts to pivot downward toward the ground. It is necessary to continue to at least partially support the ramp end during the pivoting downward phase so that it will not drop too rapidly and possibly cause damage to the ramp.

As remotely controlled operation of retracting the ramp begins, the outer section of the ramp first is raised to an essentially horizontal position before the powered means starts to pull the ramp back into the support structure. If the ramp were to be retracted without being essentially horizontal, the mechanical forces involved in pulling the ramp back would be very high because they would include the forces required to rotate the ramp outer section upward, with very little mechanical leverage. This would necessitate much larger retraction forces and possible damage to the ramp and/or support structure. Therefore, a "two-step" extension process and a related "two-step" retraction process are provided as essential.

The actual application of force to extend the ramp while in a horizontal position and to retract it again while horizontal can be done by any of various force means, such as electrical motor powered gear drive, pneumatic cylinders, hydraulic cylinders, electric motor driven flexible cable, with the ultimate source of power being the vehicle battery.

As explained above, it is very desirable and almost essential to provide a "two-step" operation of first extending the ramp horizontally and then supporting and gently lowering the outer end of the ramp until it rests on the ground or curb, and then reversing the process during ramp retraction by first raising the ramp to a horizontal position and then retracting it horizontally into its support structure by an appropriate force means.

It is pointed out that the subject ramp may be either power or manually operated. However, if the ramp is expected to be operated by a wheelchair occupant, a remote controlled power operated system must be provided. There are a number of alternative methods which may be used to power operate extension and retraction of the ramp. These include, but are not limited to electric motor driven flexible cable systems, rack gear (rigid and flexible) systems, linear guided cable systems, and worm gear/ball nut systems as well as air and hydraulic systems. Presented in this application are two alternative flexible cable systems.

Both methods involve the use of flexible cables which are pulled by an electric motor powered tension and winding mechanism.

The first configuration for raising and lowering the ramp end involves a pivoted leg at the outer end of the ramp, controlled by a cable running along with, and essentially parallel to, the ramp itself. The leg is in contact with the ground while the ramp is lowered and raised and provides the support and force necessary for these operations.

The second configuration used for raising and lowering the outer end of the ramp involves two cables attached to, or to points near, the outer corners of the ramp, the cables running diagonally upward to pulleys located fairly high above the floor on each side of the door opening. When the cables are under tension the upward component of force acts to support the ramp and to lower or raise it gently as required.

The outer or main portion of the ramp is attached to a shorter inner or base section by a hinge. The inner base section functions as the place of attachment of the cable (or equivalent force means) which actuate the horizontal extension and retraction of the ramp. It also functions as a firm support for the ramp while the main outer section is being pivoted up or down and when the ramp is supporting the wheelchair occupant. It is clear that this inner ramp section can be rather short, if desired, and could even function adequately in the extreme case in which the separate ramp inner section and the hinge consist of the inward edge of the main ramp section which may be sufficiently reinforced to withstand the cable forces and which could be fitted with bearings at its ends (corners) to provide support by the outer edge of the support structure and to allow the ramp to pivot after it is fully extended. However, a configuration using the leaf springs requires an inner base section of reasonable length plus hinge attachment in order to provide anchoring and support for the inner ends of the leaf springs.

Motorized cable and winding structure is provided for extending and retracting the ramp and the cantilever weight of the outer end portion of the ramp is substantially fully supported from the base end portion of the ramp through the utilization of underlying leaf springs mounted from the base end portion of the ramp at one pair of corresponding ends and underlying the outer end portion of the ramp at the other set of corresponding ends thereof. The springs are not quite strong enough to support the full cantilever weight of the outer end portion of the ramp tending to downwardly swing the outer end portion of the ramp relative to the base end portion as the ramp approaches its fully extended position. However, the springs are sufficiently strong to substantially fully overcome the force of gravity. The ramp and its mechanism can function without supporting leaf springs, but the use of the leaf springs is desirable in order to minimize the forces required to support the weight of the ramp during the pivoting operations.

In the first embodiment of this invention, in addition to the springs, the outer end portion of the ramp includes a central pivoted leg which may be swung between a depending ramp supporting position and an upwardly retracted horizontal position. The leg is equipped with a wheel on its lower end and is operatively connected to the cable and winding mechanism for extending and retracting the ramp in a manner such that as the ramp is being extended the leg tends to swing by gravity toward its depending operative position and as the ramp reaches its fully extended position the tension on one part of the extending cable for the ramp is reduced to thereby allow the leg to swing partially toward a retracted position and the outer end of the ramp to lower toward the supporting surface disposed therebeneath, whether that supporting surface be on the same level as the wheels of the associated van or at an elevated level such as a sidewalk. In addition, the connection of the cable to the leg is such that when the cable is actuated to retract the ramp relative to the associated van side, initial tension on the cable tends to swing the leg toward a vertical position to thus elevate the outer end portion of the ramp as the ramp is initially shifted in a retracting direction. This enables the coacting guide and support structure for the outer end portion of the ramp from the van floor to engage each other during retraction of the ramp with the outer end portion of the ramp being substantially co-planar with the base end portion thereof.

In order to insure that a wheelchair occupant could exit the vehicle in the event of a failure in the ramp operating power system or in the vehicle's electrical system, a means of manually extending the ramp is an integral part of this invention. The exact means to accomplish this has not been defined in the application, but several means are available. These include the removal of a pin to disconnect the power system from the ramp to allow a wheelchair occupant to manually extend the ramp by means such as a lever or cable, manually operating the ramp power system by a hand crank provided in the vehicle, etc.. The exact method of providing emergency exit to a very large extent is dependent upon the specific design of the ramp actuation system.

The main object of this invention is to provide a loading and unloading ramp for van-type vehicles which may be utilized by persons confined to wheelchairs.

Another object of this invention is to provide a loading ramp which may be readily incorporated into the manufacture of numerous different types of vans presently being manufactured in this country.

A further object of this invention is to provide a ramp in accordance with the preceding objects which may be readily operated by a person confined in a wheelchair.

Another important object of this invention is to provide a ramp which will automatically compensate for different height supporting surfaces for the outer end portion of the ramp.

A further object of this invention is to provide a ramp which may be incorporated into the manufacture of a van floor such that the upper surface of the ramp is substantially co-planar with the upper surface of the van floor, whereby a person confined to a wheelchair and having loaded himself into an associated van may then move his wheelchair to the operator's position of the van.

Another very important object of this invention is to provide a ramp construction which may utilize various different forms of guiding and supporting structures therefor during extension and retraction of the ramp and which will support the ramp in a fully retracted position in a manner such that the ramp will not rattle during movement of the van.

Another object of this invention is to provide a ramp structure which may be readily adapted to include collapsible side railings, if desired.

A final object of this invention to be specifically enumerated herein is to provide a loading and unloading ramp for the side door of a van in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Referring now more specifically to the drawings the numeral 10 generally designates a conventional form of automotive van including a right front passenger side door 12 and a mid-length right side door opening 14 immediately behind the door 12 and with which a sliding door 16 is operatively associated for movement into and out of position closing the opening 14. The door 16 is supported from the van 10 for sliding movement between the open and closed positions of the door 16, but the opening 14 may have double side doors or be a single side door of the hinged type operatively associated therewith and be located on either side of the vehicle.

The van 10 includes a reasonably flat floor assembly 18 over which a wheelchair and its occupant may move with relative ease and the van 10 may have the usual operator's seat removed therefrom and the operator's position may be provided with structure for locking a wheelchair in position at the operator's location. In this manner, the van may be operated by a person confined to a wheelchair.

However, in order to enable egress and ingress of a person confined to a wheelchair, a ramp assembly referred to in general by the reference 20 is provided and is mounted in operative association with the floor assembly 18 for movement between extended and retracted positions.

The floor assembly 18 incorporates a pair of transversely extending and longitudinally spaced guide assemblies 22 mounted therein and each guide assembly 22 includes a plurality of support brackets 24 and an elongated guide channel 26. The ramp assembly 20 further includes a ramp referred to in general by the reference numeral 28 and including longitudinally aligned base and outer end portions 30 and 32. The base end portion 30 is relatively short and the outer end portion 32 is relatively long. The portions 30 and 32 are end aligned and pivotally joined together through the utilization of a pair of hinges 34. The portions 30 and 32 are substantially coplanar when disposed in fully retracted positions and the remote longitudinal side edges thereof are slidingly-guidingly received in the channels 26, each channel 26 being provided with a longitudinal slot 36 and guidingly receiving an abutment member 38 therethrough. Engagement of the abutment members 38 with the opposite ends of the slots 36 define inward retraction and outward extension limits of the ramp 30 relative to the vehicle 10.

The right side wall 40 of the van 10 in which the opening 14 is provided comprises that marginal portion of the van 10 relative to which the ramp 28 may be extended and retracted. As the ramp 28 is extended (shifted to the left as viewed in FIG. 2) from the fully retracted position thereof illustrated in solid lines in FIG. 2, final movement of the ramp 28 toward the extended position moves the opposite longitudinal marginal edges of the outer end portion 32 out of guided engagement with the guide channels 26. Thus, the outer end portion 32 is acted upon by gravity to swing the outer end portion 32 downwardly relative to the base end portion 30 which remains guidingly supported from the guide channels 26. However, in addition to the hinges 34, a pair of leaf springs 42 underlie and are secured to the base portion 30 and extend beneath and underlie the outer end portion 32 and exert an upward force on the outer end portion 32 to the extent that the cantilever gravity weight of the outer end portion 32 is substantially, but not fully, opposed by the leaf springs 42. Thus, as the zone of pivotal connection between the base portion 30 and the outer end portion 32 approaches the ends of the channels 26 adjacent the side wall 40, the tendency of the outer end portion 32 to bind with the channels 26 is substantially eliminated.

In order to extend and retract the ramp 28, a winch assembly referred to in general by the reference numeral 46 is provided and includes a pair of peripherally grooved winding drums 48 and 50 disposed in slightly laterally spaced parallel relation, the drum 48 being selectively reversely driven by an electric motor 51 receiving its current from the electrical system of the van 10. A cable 52 has one end thereof anchored to the underside of the base portion 30 as at 54 and extends about a guide pulley 56 spring mounted from the side wall 40 through the utilization of an expansion spring 58. The cable 52 then passes back toward and is several times wound about the winding drums 48 and 50 and thereafter extends again toward the side wall 40 from the winding drum 48 and is anchored as at 60 to the short arm 62 of a bell crank 64 also including a long leg 66. The bell crank 64 is pivotally mounted as at 68 within a longitudinal slot 70 formed in the outer end portion 32 and the free end of the long leg 66 includes a ground engageable roller or wheel 72.

The upper surface of the outer end portion 32 is grooved as at 74 immediately inward of the inner end of the slot 70 and the end of the groove 74 adjacent the slot 70 curves downwardly as at 76.

The reach of the cable 52 extending between the winding drum 48 and the free end of the short leg 62 of the bell crank 64 passes partially about a pair of stationarily mounted pulleys 78 and 80 and also about an intermediate pulley 82 which laterally deflects the portion of the cable 52 extending between the pulleys 78 and 80. The pulley 82 is spring mounted by an expansion spring 84 from the floor assembly 18. Thus, both of the pulleys 56 and 82 are spring mounted.

Figure 1:
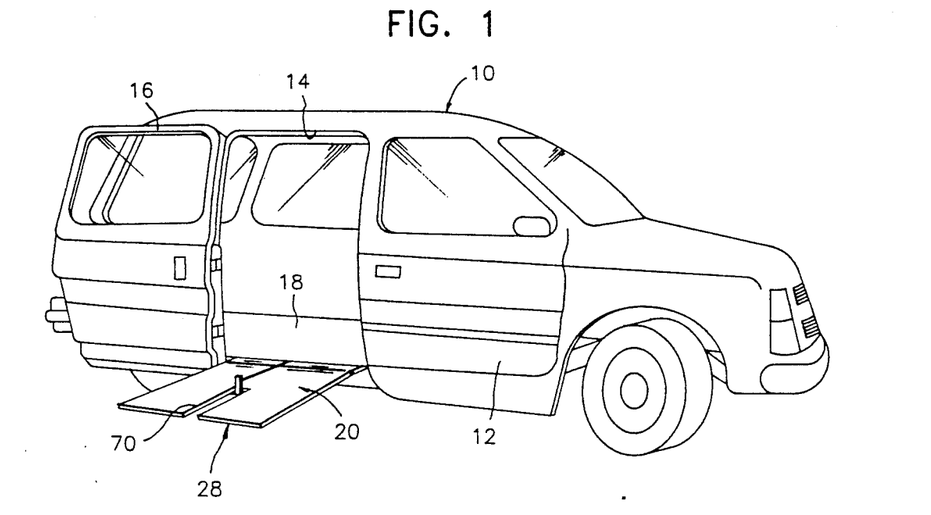
FIG. 1 is a perspective view of a recent form of minivan in which the loading ramp of the instant invention has been incorporated.
Figure 2:
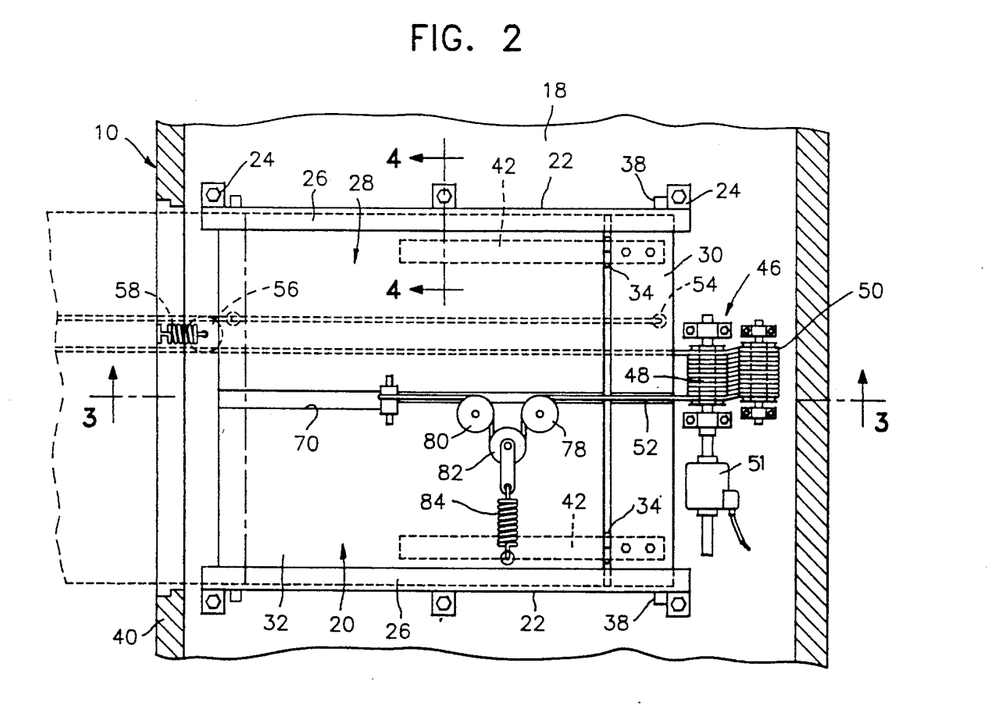
FIG. 2 is a fragmentary enlarged horizontal sectional view of the central flooring portion of the van illustrating the ramp in a fully retracted position.

In operation, and assuming the ramp 28 is in the fully retracted position thereof illustrated in phantom lines in FIG. 2 and that the door 16 has been opened, the electric motor 51 may be electrically actuated to wind that portion of the cable 52 extending between the winding drum 48 and the pulley 56 upon the winding drum 48 and winding drum 50 and to unwind that portion of the cable 52 extending between the bell crank 64 and the winding drum 48. This, of course, will cause the ramp 28 to be extended outwardly through the opening 14.

As hereinbefore set forth, the springs 42 exert an upward biasing action on the underside of the outer end portion 32. Further, as soon as the ramp 28 is partially extended from the position thereof illustrated in FIG. 3, the end of the long lever 66 from which the wheel 72 is journalled moves outwardly of the margin of the van 10 and swings downwardly by gravity toward the ground 90 upon which the van 10 rests. The end of the cable 52 attached to the short leg 62 of the bell crank 64 is under medium tension via the spring 84.

Figures 5, 6:
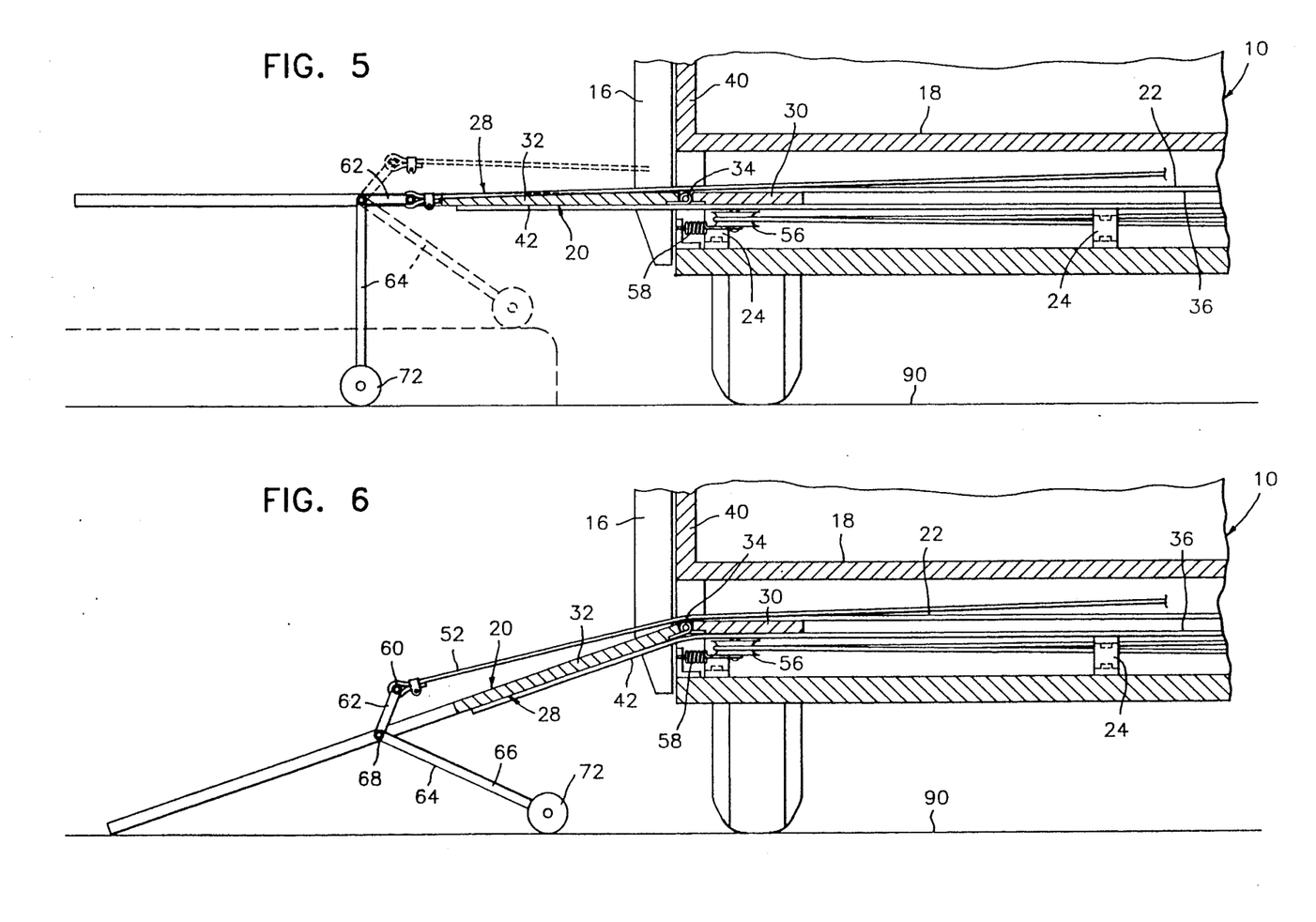
FIG. 5 is an enlarged fragmentary vertical sectional view similar to FIG. 3 but illustrating the right hand side of the van (ramp may be located at a left side door) and the ramp extended from the right side thereof and immediately prior to the outer end portion of the ramp being lowered toward a supporting surface disposed therebeneath.
FIG. 6 is a fragmentary vertical sectional view similar to FIG. 5 but illustrating the outer end portion of the ramp in a lowered position.
Figure 7:
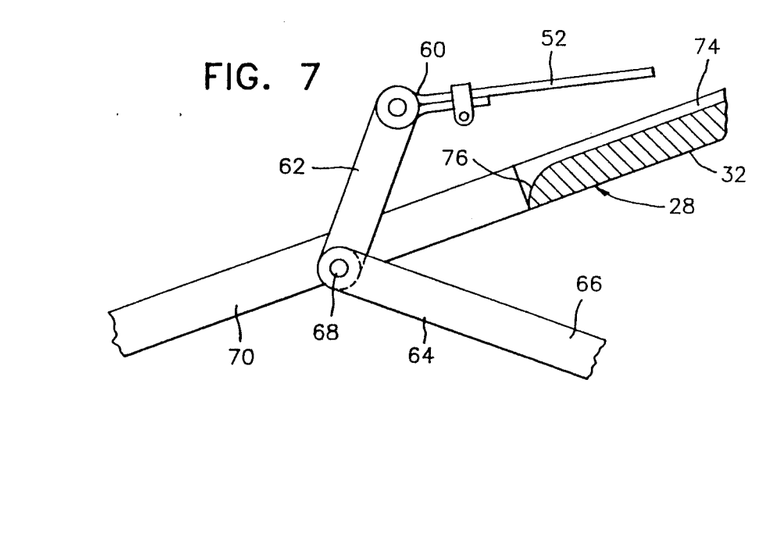
FIG. 7 is a fragmentary vertical sectional view illustrating the manner in which the operating cable for the ramp is connected to the retractable outer end support leg of the ramp.

As the ramp 28 reaches its fully extended position, the motor 51 remains in operation for a short period and thus applies additional tension to that portion of the cable 52 extending between the anchor point 54, about the pulley 56 and to the winding drum 48 and thereby reduces the tension on that portion of the cable 52 extending between the winding drum 48, about the pulleys 78, 80 and 82 and attached to the short leg 62. Thus, the bell crank 64 swings from a substantially upright position to the position thereof illustrated in FIG. 6 and allows the outer end portion 32 of the ramp 28 to swing downwardly toward the ground 90. In addition, with attention now invited again to FIG. 5, should the van 10 be disposed alongside a sidewalk, it may be seen from the phantom line position of the bell crank 64 that the bell crank 64 will also compensate for different height ground surfaces outwardly of the right side of the van 10.

After the outer end portion of the ramp 28 has been lowered to the ground 90, actuation of the motor 51 is terminated. When it is desired to again retract the ramp 28, the motor 51 is operated in the reverse direction and the end of the cable 52 passing about the pulleys 78, 80 and 82 is that end of the cable which is immediately tensioned and the tensioned cable exerts a pull on the short leg 62 of the bell crank 64 to thereby almost immediately elevate the outer end portion 32 of the ramp 28 to a position co-planar with the end portion 30 of the ramp as the ramp 28 is initially moved toward its retracted position. Therefore, the outer end portion 32 automatically will have its opposite side marginal edges registered with and receivable in the guide channels 26.

Figure 3:
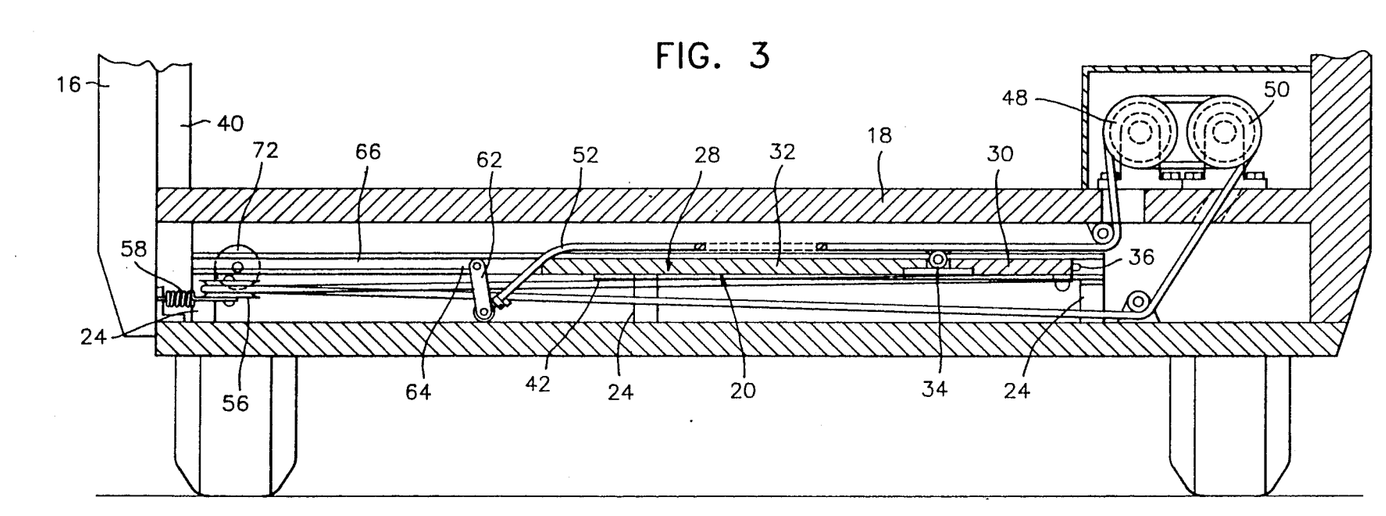
FIG. 3 is an enlarged fragmentary vertical sectional view taken substantially upon the plane indicated by the section line 3—3 of FIG. 2.
Figure 4:
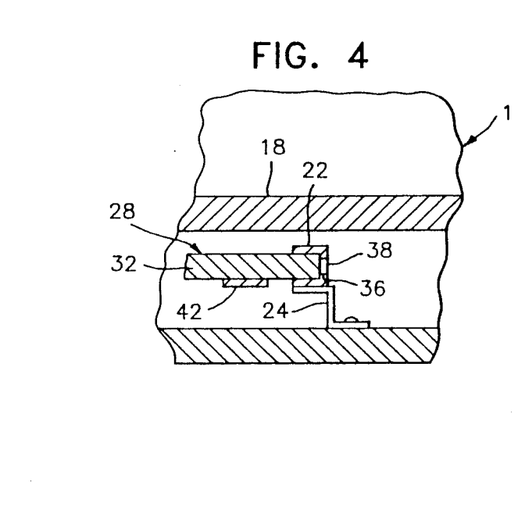
FIG. 4 is an enlarged fragmentary vertical sectional view taken substantially upon the plane indicated by the section line 4—4 of FIG. 2.

As the ramp 28 continues inwardly, the upper portion of the long leg 66 will engage the lower portion of the right side of the floor assembly 18 and be cammed toward the fully retracted position illustrated in FIG. 3 as the ramp 28 continues to move toward the fully retracted position.

Of course, the electrical controls for the motor 51 may be disposed in any convenient location so that the ramp 28 may be extended or retracted either from within the van 10 or from outside the van 10.

Although the support and guide structure by which the ramp 28 is supported from the floor assembly 18 is illustrated and described herein before merely as guide channels, other suitable support and guide structures may be used in order to assure that the ramp 28 will not rattle during movement of the van. Also, the ramp 28 may be constructed in a manner such that the ramp, when in the fully retracted position, is substantially flush with the upper surface of the floor assembly 18. Further, if it is desired to maintain the ramp in a position spaced slightly beneath the upper surface of the floor assembly, there need be only approximately $\frac{1}{4}$" difference in height between the upper surface of the floor assembly 18 and the upper surface of the ramp 28.

Figure 8:
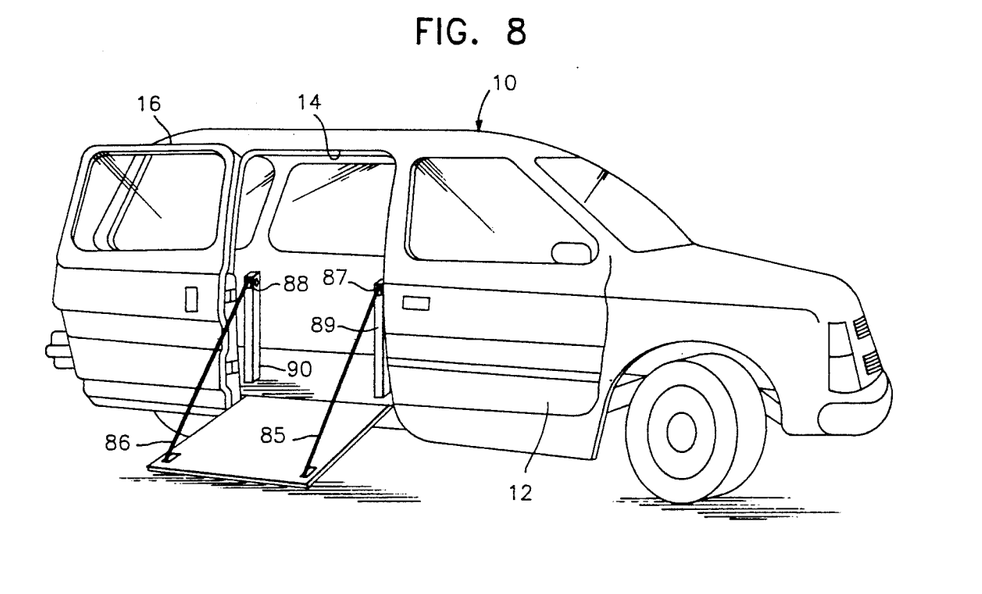
FIGS. 8 and 9 are perspective views of a mini-van in which a second embodiment of the loading ramp of the instant invention has been incorporated, FIG. 9 illustrating the outer end of the ramp horizontally disposed and FIG. 8 illustrating the outer end or section of the ramp downwardly and outwardly inclined.
Figure 9:
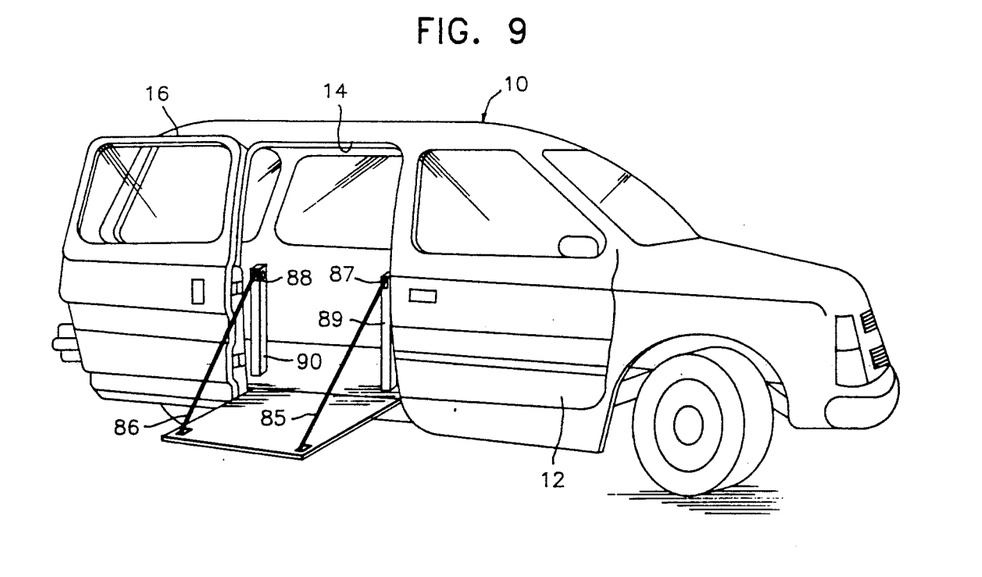

A second alternate means of supporting or lifting the outer portion of the ramp after ramp extension and prior to ramp retraction is shown in FIG. 8. Cable end portions 85 and 86 are attached respectively to or near the outer corners of the outer ramp portion 32. Cable end portions 85 and 86 enter and leave the van across pulleys 87 and 88 respectively which are shown as being located fairly high above the van floor level at the top end of hollow stationary stanchions 89 and 90 located in the van along each vertical side of the door opening 14. The pulleys 87, 88 and stanchions 89, 90 serve to support and guide the cable end portions into the van where they are operably connected to a powered reeling, winding, and tensioning mechanism (not shown).

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A vehicle and loading ramp combination including a vehicle having a floor assembly and an upstanding wall projecting upwardly from said floor assembly and having a door opening formed therein including a lower margin, an elongated ramp including a relatively short extendable and retractable inner base end portion and a considerably longer extendable and retractable outer end portion, said portions being arranged in adjacent end aligned relation and pivotally joined at adjacent ends for limited relative angular displacement about a horizontal transverse axis, said ramp portions and floor assembly including coacting support and guide means supporting said ramp for guided shifting between a retracted position with the entire ramp retracted inwardly of said opening and a limited extended position with said inner end portion retained inwardly of but adjacent said opening and at least a major length portion of said outer end portion extending outward of said opening, said coacting support and guide means being constructed such that the guided support of said outer end portion from said floor assembly is terminated as said ramp is extended to said limited extended position, thereby freeing said outer end portion for downward swinging of the end thereof remote from said base end portion by gravity, biasing means operatively connected between said sections yieldingly resisting relative downward swinging of said outer end section relative to said base end portion, said biasing means being operative to oppose a major portion, only, of the force of gravity acting upon said outer end portion to swing the outer end thereof downwardly.

2. The combination of claim 1 including force means connected between said base portion and floor assembly for selectively extending and retracting said ramp through said opening.

3. The combination of claim 2 wherein said force means includes a winding and reeling mechanism mounted from said van and elongated flexible tension member means windingly engaged with said winding and reeling mechanism and operably connected to said ramp.

4. The combination of claim 3 wherein said tension member means includes opposite end portions anchored to said base and free end portions of said ramp and a longitudinal mid-portion of said tension member means is windingly engaged with said winding and reeling mechanism.

5. The combination of claim 4 wherein said floor assembly includes first and second tension member end portion slack take-up and tensioning means operably engaged with said opposite end portions of said tension member.

6. The combination of claim 5 wherein the outer end portion of said ramp includes downwardly swingably extendable and upwardly swingably retractable support leg means mounted therefrom, the end portion of said tension member means connected to said outer end portion of said ramp being operably connected to said support leg means, said support leg means being downwardly swingable by gravity to an extended position and upwardly swingably retractable responsive to forcibly contacting the bottom of the said coacting support and guide means, said winding and reeling mechanism and said slack take-up and tensioning means being operative during extension of said ramp to reduce the tension of said tension member end portion anchored to said support leg means and to increase the tension of the last-mentioned tension member end portion responsive to retraction of said ramp.

7. The combination of claim 6 wherein the extendable and retractable end of said leg means includes roller means journalled therefrom.

8. The combination of claim 1 wherein said biasing means comprises elongated leaf spring means having a first end underlying and anchored relative to said base end portion and a free end underlying and upwardly biasing said outer end portion.

9. A support structure including a first horizontal marginal portion, an elongated ramp including a relatively short extendable and retractable inner base end portion and a considerably longer outer end portion extendable and retractable relative to said marginal portion, said portions being arranged in end aligned relation and pivotally joined at adjacent ends for limited angular displacement about a horizontal transverse axis, said ramp portions and support structure including coacting support and guide means supporting said ramp for guided shifting between a retracted position with the entire ramp retracted inwardly of said marginal portion and a limited extended position with said inner end portion retained inwardly of said marginal portion and said outer end portion including at least a major length portion thereof extended outwardly of said margin, said coacting support and guide means being constructed such that the guided support of said outer end portion from said support assembly is terminated as said ramp is extended to said limited extended position, thereby freeing said outer end portion for downward swinging of the end thereof remote from said base end portion by gravity, biasing means operatively connected between said portions yieldingly resisting relative downward swinging of said outer end portion relative to said base end section, said biasing means being operative to counteract a major portion, only, of the force of gravity acting upon said outer end portion to swing the outer end thereof downwardly.

10. The combination of claim 9 wherein said biasing means comprises elongated leaf spring means having a first end underlying and anchored relative to said base end portion and a free end underlying and upwardly biasing said free end portion.

11. The combination of claim 10 including force means connected between said base portion and support structure for selectively extending and retracting said ramp through said opening.

12. The combination of claim 11 wherein said force means includes a winding and reeling mechanism mounted from said support structure and elongated flexible tension member means windingly engaged with said winding and reeling mechanism and operably connected to said ramp.

13. The combination of claim 12 wherein said tension member means includes opposite end portions anchored to said base and free end portions of said ramp and a longitudinal mid-portion of said tension member means is windingly engaged with said winding and reeling mechanism.

14. The combination of claim 13 wherein said support structure includes first and second tension member end portion slack take-up and tensioning means operably engaged with said opposite end portions of said tension member.

15. The combination of claim 14 wherein the outer end portion of said ramp includes downwardly swingably extendable and upwardly swingably retractable support leg means mounted therefrom, the end portion of said tension member means connected to said outer end portion of said ramp being operably connected to said support leg means, said support leg means being downwardly swingable by gravity to an extended position and upwardly swingably retractable responsive to forcibly contacting the bottom of the said coacting support and guide means, said winding and reeling mechanism and said slack take-up and tensioning means being operative during extension of said ramp to reduce the tension of said tension member end portion anchored to said support leg means and to increase the tension of the last-mentioned tension member end portion responsive to retraction of said ramp.

16. A vehicle and loading ramp combination including a vehicle having a floor assembly and an upstanding wall projecting upwardly from said floor assembly and having a door opening formed therein including a lower margin, an elongated ramp including a relatively short extendable and retractable inner base end portion and a considerably longer extendable and retractable outer end portion, said portions being arranged in adjacent end aligned relation and pivotally joined at adjacent ends for limited relative angular displacement about a horizontal transverse axis between first at least substantially horizontally disposed and aligned relative positions and second relative positions with said base end portion horizontally disposed and said outer end portion inclined downwardly and outwardly relative to said inner end portion, said ramp portions and floor assembly including coacting support, force and guide means supporting said ramp for guided shifting between a retracted position with the entire ramp retracted inwardly of said opening and a limited extended position with said inner end portion retained inwardly of but adjacent said opening and at least a major length portion of said outer end portion extending outward of said opening, said coacting support, force and guide means being selectively actuatable to extend and retract said ramp and including means, when actuated to extend said ramp, to extend said ramp from said retracted position to at least substantially said limited position while maintaining said portions in said first relative positions and to thereafter cause said portions to shift to said second relative positions as said ramp reaches said limited extended position and, when actuated to retract said ramp from said limited extended position, to initially shift said portions from said second relative positions to said first relative positions and to thereafter shift said ramp from said limited extended position to said retracted position.

17. The combination of claim 16 wherein said support, force and guide means includes winding and reeling means mounted from said van and elongated flexible tension member means windingly engaged with said winding and reeling means and operably connected to said ramp.

18. The combination of claim 17 wherein said tension member means includes opposite end portions anchored to said base and free end portions of said ramp and a longitudinal mid-portion of said tension member is windingly engaged with said winding and reeling mechanism.

19. The combination of claim 18 wherein said floor assembly includes first and second tension member end portion slack take-up and tensioning operably engaged with said opposite end portions of said tension member.

20. The combination of claim 17 wherein said winding and reeling means includes a first winding and reeling means operatively connected between said van and ramp for extending and retracting said ramp and a second winding and reeling means operatively connected between said van and ramp for raising and lowering said outer end portion relative to said inner base end portion.

* * * * *